C. E. SMITH.

MACHINE FOR PACKAGING METALLIC LEAF IN ROLLS.

APPLICATION FILED DEC. 7, 1912.

Reissued May 5, 1914.

13,722.

5 SHEETS—SHEET 1.

WITNESSES

Walter C. Paff

W. S. Marsh

INVENTOR

Charles E. Smith per S. Scholfield

ATTORNEY

COLUMBIA PLANOGRAPH CO., WASHINGTON, D. C.

C. E. SMITH.
MACHINE FOR PACKAGING METALLIC LEAF IN ROLLS.
APPLICATION FILED DEC. 7, 1912.
Reissued May 5, 1914.
13,722.
5 SHEETS—SHEET 2.
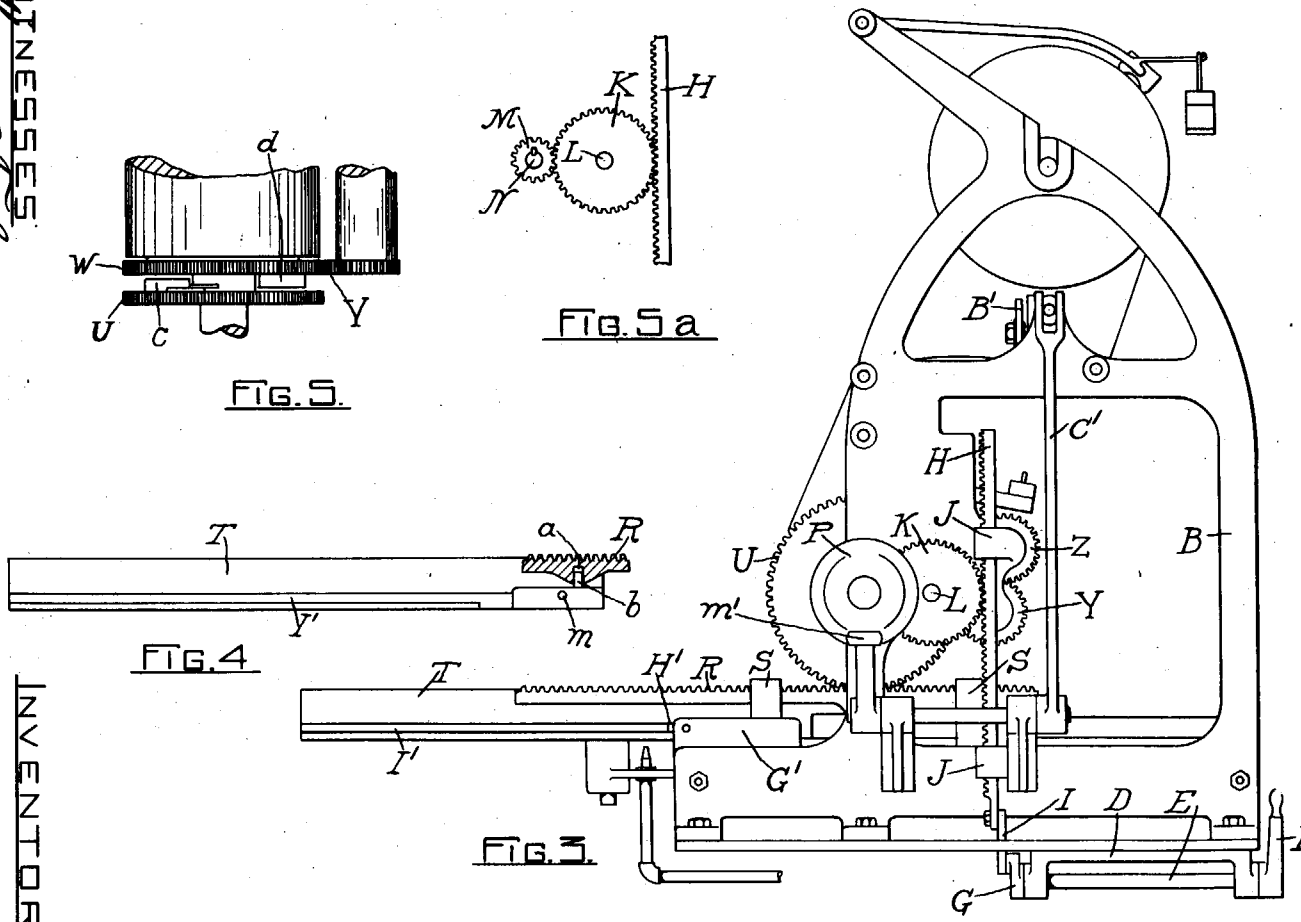
WITNESSES
Walter E. Taft.
W. S. Marsh
INVENTOR
Charles E. Smith
per A. Schofield
ATTORNEY
COLUMBIA PLANOGRAPH CO., WASHINGTON, D. C.

C. E. SMITH.
MACHINE FOR PACKAGING METALLIC LEAF IN ROLLS.
APPLICATION FILED DEC. 7, 1912.
Reissued May 5, 1914.
13,722.
5 SHEETS—SHEET 3.
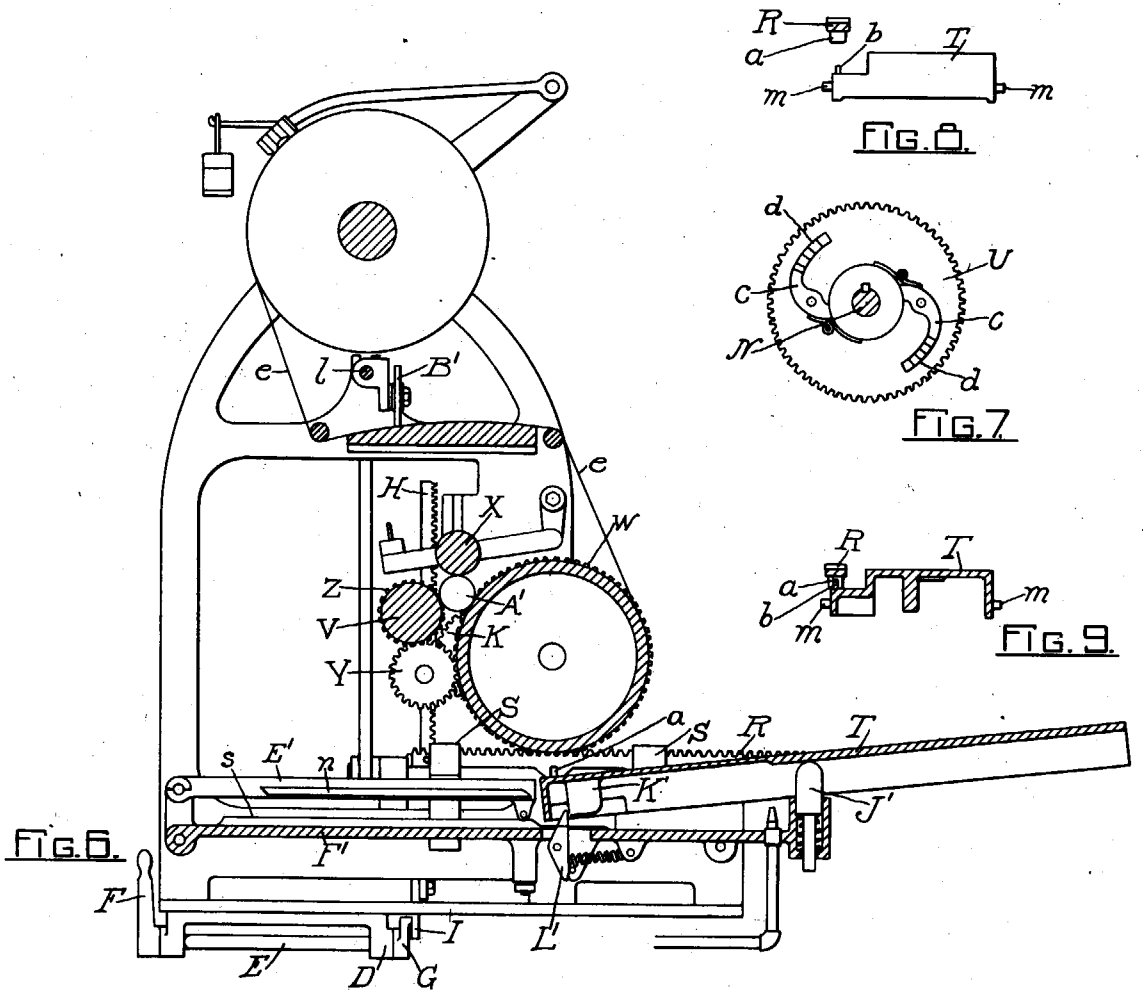
WITNESSES
Walter E. Taft.
W. S. Marsh
INVENTOR
Charles E. Smith
per S. Schofield
ATTORNEY
COLUMBIA PLANOGRAPH CO., WASHINGTON, D. C.

C. E. SMITH.

MACHINE FOR PACKAGING METALLIC LEAF IN ROLLS.

APPLICATION FILED DEC. 7, 1912.

Reissued May 5, 1914. 13,722.

5 SHEETS—SHEET 4.

WITNESSES

Walter E. Taff

W. S. March

INVENTOR

Charles E. Smith per S. Schofield

ATTORNEY

COLUMBIA PLANOGRAPH CO., WASHINGTON, D. C.

C. E. SMITH.
MACHINE FOR PACKAGING METALLIC LEAF IN ROLLS.
APPLICATION FILED DEC. 7, 1912.
Reissued May 5, 1914. 13,722.
5 SHEETS—SHEET 5.
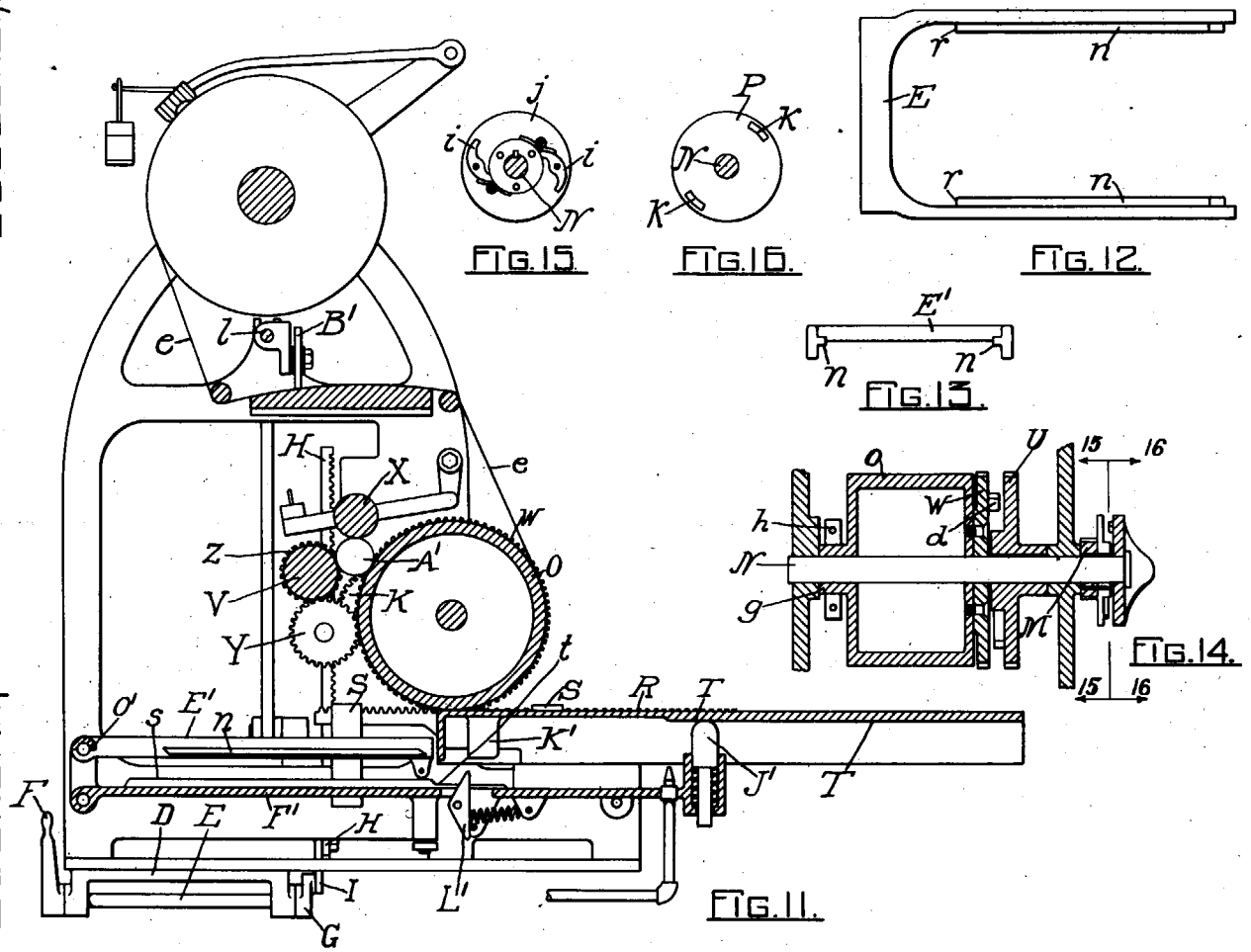
WITNESSES.
Walter E. Taft
W. S. March.
INVENTOR.
Charles E. Smith
per S. Schofield
ATTORNEY.
COLUMBIA PLANOGRAPH CO., WASHINGTON, D. C.

UNITED STATES PATENT OFFICE.

CHARLES E. SMITH, OF OAK LAWN, RHODE ISLAND.

MACHINE FOR PACKAGING METALLIC LEAF IN ROLLS.

13,722. Specification of Reissued Letters Patent. Reissued May 5, 1914.

Original No. 975,472, dated November 15, 1910, Serial No. 484,072. Renewed February 26, 1910, Serial No. 546,255. Application for reissue filed December 7, 1912. Serial No. 735,577.

*To all whom it may concern:*

Be it known that I, CHARLES E. SMITH, a resident of Oak Lawn, in the town of Cranston, State of Rhode Island, have invented a new and useful Improvement in Machines for Packaging Metallic Leaf in Rolls, of which the following is a specification.

My invention consists in the improved construction of the machine whereby the sheets of metallic leaf in the book may be fed to the supporting strip and lapped thereon under the complete control of the operator prior to the action of the machine. And it also consists in the improved construction of the machine, whereby an increased degree of pressure is applied to the rear end of the sheet of metallic leaf as it is being fed to the supporting paper strip, so that the rear end of the said sheet will be prevented from dropping away from the surface of the paper strip upon the downward movement of the feeding table by means of which the sheets of metallic leaf are applied to the strip.

Figures 1, 2:
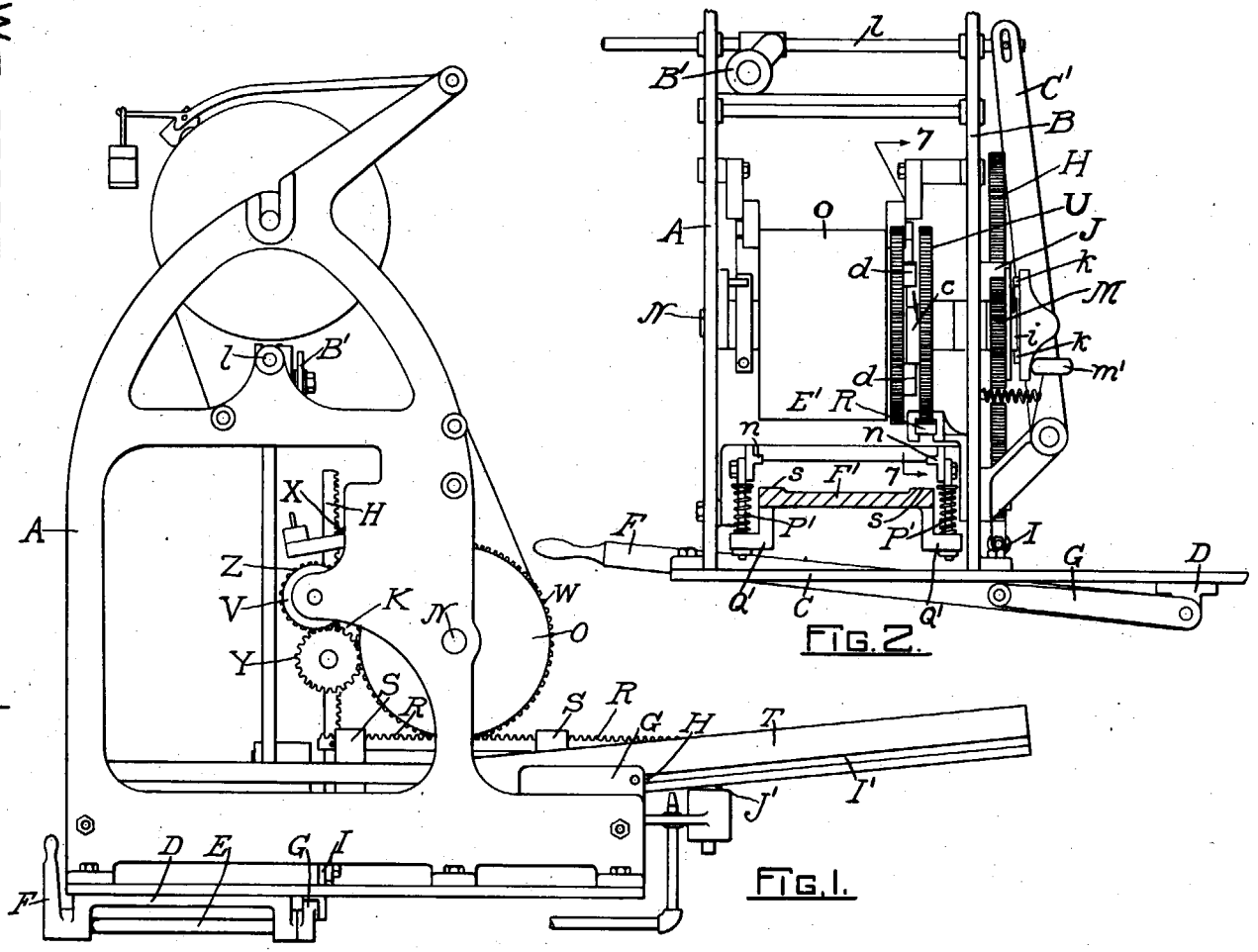
Figure 10:
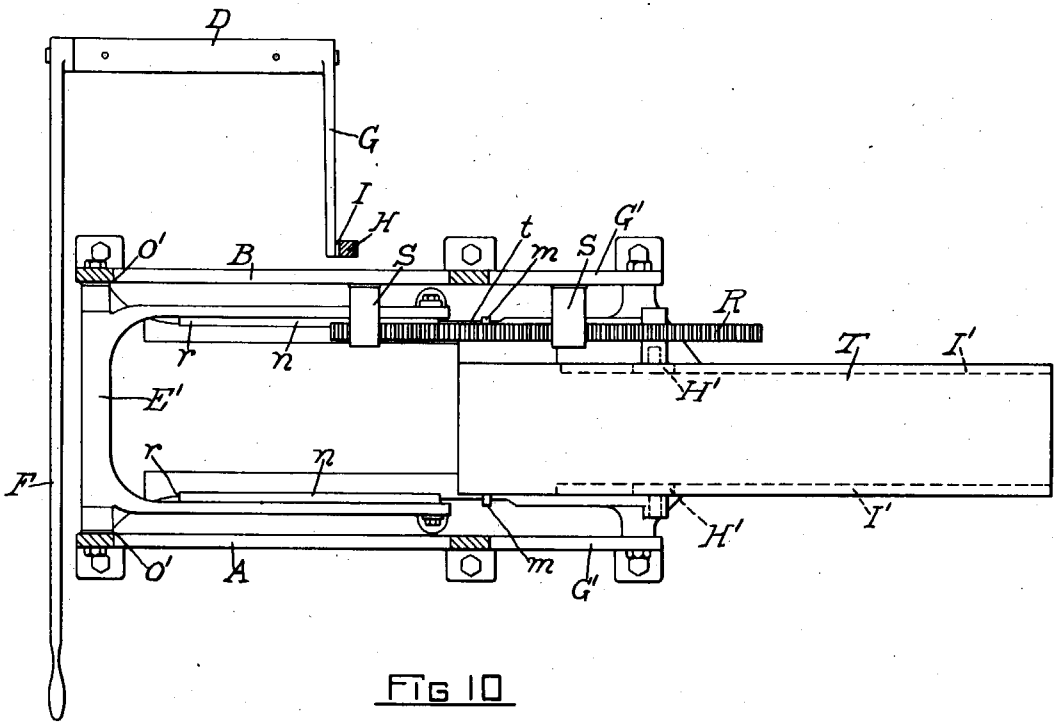

In the accompanying drawings, Figure 1 represents a side elevation of the machine. Fig. 2 represents a detail view and partial section taken from the front of the machine. Fig. 3 represents a side elevation of the machine taken opposite to that of Fig. 1. Fig. 4 represents an edge view of the feeding table showing its engagement with the sliding rack. Fig. 5 represents a detail top view showing the gears and catches by means of which the pressure roll of the machine is intermittently operated. Fig. 5[a] represents the intermediate gear and pinion by means of which the vertically sliding rack is connected with the feeding bed. Fig. 6 represents a central vertical section. Fig. 7 represents a section taken in line 7, 7 of Fig. 2. Fig. 8 represents an end view of the hand operated feeding table. Fig. 9 represents a transverse section of the same. Fig. 10 represents a horizontal section taken on the line 10, 10, of Fig. 1 showing a top view of the feeding table. Fig. 11 represents a central vertical section showing the feeding table in its position of engagement with the reciprocating rack. Fig. 12 represents a plan view of the pivotally held track member. Fig. 13 represents the forward end view of the same. Fig. 14 represents an axial section of the pressure-roll and the actuating gears. Fig. 15 represents a section taken in the line 15, 15, of Fig. 14. Fig. 16 represents a section taken in the line 16, 16, of Fig. 14.

In the drawings, A and B represent the side frames of the machine and C the bed to which the side frames are attached. To the under side of the bed C, is attached the bracket D, which supports the shaft E at the outer end of which is secured the hand lever F by means of which the machine is operated, and to the inner end of the said shaft E, is secured the arm G, which is operatively connected with the vertically sliding rack H by means of the intermediate link I, as shown in Fig. 3, the said rack being caused to slide in the fixed guides J, J, and by means of the lever F in connection with the rack H, the machine is operated. The gear K is held loosely upon a stud L, which projects from the side of the frame B, and the said gear engages with the pinion M which is tight upon the shaft N of the pressure-roll of the machine, the said shaft being provided at its outer end with the cam disk P, and to the shaft N between the side frames A and B is secured the gear U the teeth of which engage with the teeth of the horizontal sliding rack R, which is held for movement in the guide brackets S, S, secured to the frame B as shown in Fig. 2, the said rack being provided at its lower side with the notch *a*, which is adapted for the entrance of the engaging stud *b*, which stud projects upward from the edge of the feed table T, as shown in Figs. 8 and 9, whereupon the said feed table will partake of the movement of the rack R, the said rack being always in engagement with the teeth of a gear U, splined to the shaft N which is journaled in the frame members A and B, as shown in the detail section Fig. 14, and at the inner side of the said gear U are placed the pivoted spring actuated dogs *c*, *c*, which engage with the lugs *d*, *d*, formed upon the outer side of the gear W. The gear W is secured to the side of the presser-roll O which latter forms a supporting bed for the strip of paper *e* upon which the metallic leaf is to be placed, the said gear W and pressure-roll being loose upon the said shaft N. The pitch line of the gear W conforms to the periphery of the said pressure-roll and the teeth of the said gear engage with the teeth of the gear Y, which forms an intermediate between the gear W and the gear Z, which latter gear serves to drive one of the rolls V, of the winding up cluster. The hub *g*, of the pressure-roll O which is loose upon the shaft N is provided with the friction brake *h*, which serves to check the momentum of the said pressure-roll and of the connected parts of the winding up mechanism. The package roll A′ is wound up as usual in the space between the stationarily held roll V, the pressure-roll, and the weighted movable roll X. The cam disk P is loose upon the shaft N and is caused to make one half of a revolution at the upward movement of the operating lever F, by means of the engagement of the spring actuated dogs *i*, *i*, which are attached to the face of the disk *j* secured to the outer side of the gear pinion M, which is fixed to the shaft, and which engage with the lugs *k k* at the inner side of the cam disk P, so that at each half revolution of the said cam disk, the wax roll B′ will be moved from side to side across the paper strip, and this cam movement is to be so arranged that the said wax roll will be so moved at the time that the hand operated lever F is being moved upward and the paper strip *e* is consequently at rest. Connection is made between the wax roll B′ and the cam-disk F, by means of the sliding rod *l*, the lever C′, and an antifriction roller *m*′, as shown in Fig. 2. The feeding table T, is arranged between the cheeks G′, G′, and guided by means of the swivel guides H′, H′, which enter the longitudinal edge grooves I′ I′, the table being tilted forward by the upward action of the spring actuated bolt J′, upon the under side of the said table, as shown in Fig. 6. And when the outer end of the feeding table T has been pressed down by the operator so as to carry the forward end of the table into engagement with the notch *a* of the rack, and a downward movement is imparted to the operating lever F, the said table and the book of metallic leaf thereon will be carried forward under the pressure-roll O, with the lateral studs *m*, *m*, of the table resting upon the supporting tracks *n*, *n*, of the bifurcated member E′, the said member being pivoted to the side frames A and B, at the point O′ and pressed upward at its outer end by means of the springs P′ P′ held by the downwardly extending lugs Q′, Q′, of the cross tie plate F′ of the frame. Now upon the continued forward movement of the feeding table T the lateral studs *m m* of the table will fall over the ends *r*, *r*, of the tracks *n*, *n*, and the table will then be carried back by the backward movement of the rack R, the forward end of the said table then resting upon the tracks *s*, *s*, of the cross tie plate F′ until the said forward end reaches the depressions *t* of the said tracks which are at the end of the stroke of the rack R, whereupon the forward end of the table T will pass downward so as to be free from engagement with the rack R, as shown in Fig. 6. The operator now draws the table back by hand to the desired position for turning the leaves of the book, from which the metallic leaf is to be taken, and then moves the table forward until the lug K′ strikes against the stop catch L′ from which position the operator raises the table to engagement with the notch *a* of the rack for forward movement therewith as before described.

The pressure exerted upon the paper strip and metallic leaf will be gradually increased as the feeding table T runs forward under the pressure roll O, as will be seen by first referring to Fig. 11, in which position the sheet of metallic leaf from the book has just been lapped upon the paper strip and the lapped parts are being simply held in contact with each other by the hand of the operator resting upon the feeding table; but as soon as the feeding table has progressed far enough for the lateral studs *m*, *m*, to engage with the supporting tracks of the bifurcated member E′, the upward pressure due to the direct action of the springs P′, P′, will be encountered and since the said bifurcated member is a lever in which the fulcrum is at one end and the power applied at the other end, the nearer the lateral studs *m*, *m*, of the feed table arrive to the fulcrum end, the greater will be the upward pressure exerted upon the said studs, and when the extreme forward position of the feeding table has been reached, there will be developed from the lever action of the feeding table itself, an increased pressure between the feeding table and the under side of the pressure roll, the feeding table in this case being fulcrumed on the guides H′, H′, and pressed in an upward direction at its forward end by means of tracks *n*, *n*, studs *m*, *m*, and springs P′, P′.

I claim as my invention:

1. In a machine for packaging metallic leaf in rolls, the combination of means for feeding the supporting paper strip intermittently forward, and a hand operated table for lapping the sheets of metallic leaf upon the paper strip.

2. In a machine for packaging metallic leaf in rolls, the combination of means for feeding the supporting paper strip intermittently forward, a hand operated table for lapping the sheets of metallic leaf upon the paper strip, and means for subsequently carrying the table forward to deposit the sheet of metallic leaf from the table upon the strip.

3. In a machine for packaging metallic leaf in rolls, the combination of means for feeding the supporting paper strip intermittently forward, with means for applying an adhesive material in lines transversely of the paper strip to secure the metallic leaf at intervals thereon.

4. In a machine for packaging metallic leaf in rolls, the combination of a table upon which the book of metallic leaf is placed, a spring-actuated means for tilting the forward end of the table downward, a pivoted stop for limiting the forward movement of the table, a reciprocating rack and means for causing the engagement of the table with the rack whenever the table is raised by the operator to cause the lapping of the sheets of metallic leaf upon the supporting strip.

5. In a machine for packaging metallic leaf in rolls, the combination of means for winding up the supporting paper strip and metallic leaf into a package roll, with a tilting table for lapping the sheets of metallic leaf upon the paper strip.

6. In a machine for packaging metallic leaf in rolls, the combination of means for winding up the supporting paper strip and metallic leaf into a package roll, with a tilting table for holding the book of metallic leaf and adapted for engagement with and disengagement from the winding up means.

7. In a machine for packaging metallic leaf in rolls, the combination of a feeding mechanism, and a winding up mechanism, with means for applying a gradually increasing degree of pressure to the sheet of metallic leaf as it is being fed onto the supporting strip, whereby the rear edge of the said sheet will be caused to adhere strongly to the supporting strip, and be prevented from dropping away therefrom, upon the downward removal of the feeding table from the pressure roll.

8. In a machine for packaging metallic leaf in rolls, the combination of a pressure roller, and the feeding table, with means for imparting forward movement to the said feeding table conjointly with the forward movement of the pressure roll and a spring-actuated track for supporting the forward end of the feeding table and pressing it toward the pressure roll.

9. In a machine for packaging metallic leaf in rolls, the combination of a pressure roll, the feeding table and means for causing the forward movement of the said feeding table under the pressure roll with a lever track pivoted at one end and supported by a spring at the other end and operating upon the forward end of the feeding table to cause a gradual increase in the upward pressure exerted thereby while the said feeding table is being carried forward over the said lever track to deposit the metallic leaf upon the supporting strip.

CHARLES E. SMITH.

Witnesses:

SOCRATES SCHOLFIELD,

BENJAMIN L. DENNIS.

Copies of this patent may be obtained for five cents each, by addressing the "Commissioner of Patents, Washington, D. C."